(12) United States Patent
Chapman

(10) Patent No.: US 8,154,653 B2
(45) Date of Patent: Apr. 10, 2012

(54) EXPANDABLE TWO AXIS OR THREE AXIS CAMERA SUPPORT

(75) Inventor: Leonard T. Chapman, North Hollywood, CA (US)

(73) Assignee: Chapman/Leonard Studio Equipment, Inc, North Hollywood, CA (US)

( * ) Notice: Subject to any disclaimer, the term of this patent is extended or adjusted under 35 U.S.C. 154(b) by 190 days.

(21) Appl. No.: 12/773,327

(22) Filed: May 4, 2010

(65) Prior Publication Data

US 2011/0273612 A1 Nov. 10, 2011

(51) Int. Cl.
*H04N 5/225* (2006.01)
(52) U.S. Cl. ........................................................ 348/373
(58) Field of Classification Search .................... 348/373
See application file for complete search history.

(56) References Cited

U.S. PATENT DOCUMENTS

| | | | |
|---|---|---|---|
| 6,608,461 | B1 | 8/2003 | Salamati |
| 2001/0045991 | A1 | 11/2001 | Van Rens et al. |
| 2002/0031348 | A1 | 3/2002 | Chapman |
| 2005/0052531 | A1 | 3/2005 | Chapman |
| 2009/0207250 | A1* | 8/2009 | Bennett et al. ............... 348/144 |
| 2010/0079101 | A1* | 4/2010 | Sidman ........................ 318/649 |

OTHER PUBLICATIONS

International Search Report and Written Opinion mailed Oct. 19, 2011 in PCT/US11/35227.
Chapman/Leonard Studio Equipment, Inc. 2005-06 Catalog, pp. 10-11, 16-17, and 96-97.
Camera Systems, Scorpio Stabilized Head Brochure, Jan. 2009.
Cinemoves, Flight Head 5 Brochure, Jan. 2009.
Libra Unlimited, Libra Head Brochure, Jan. 2009.
Netmann Systems International, Stab-C Compact Brochure, Jan. 2009.

* cited by examiner

*Primary Examiner* — Nicholas Giles
*Assistant Examiner* — Yih-Sien Kao
(74) *Attorney, Agent, or Firm* — Kenneth H. Ohriner; Perkins Coie LLP

(57) ABSTRACT

A camera support or head has a pan frame pivotably attached to a support hub. The support hub is attached to a camera crane or similar apparatus. The pan frame has first and second spaced apart and parallel adjustable length pan arms. A pan motor is attached to the pan frame and adapted to pivot the pan frame about a pan axis relative to the support hub. A tilt frame is pivotably attached to the pan frame. The tilt frame may include first and second spaced apart and parallel adjustable length tilt arms attached to opposite ends of a camera mounting plate. A tilt motor is attached to the tilt frame and to the pan frame and is adapted to pivot the tilt frame about a tilt axis perpendicular to the pan axis. The adjustable length tilt arms allow the camera head to extended to accommodate cameras requiring more vertical clearance. The adjustable length tilt arms allow the camera platform to be moved to better locate the center of gravity of the camera on the tilt axis, for more balanced loading.

17 Claims, 13 Drawing Sheets

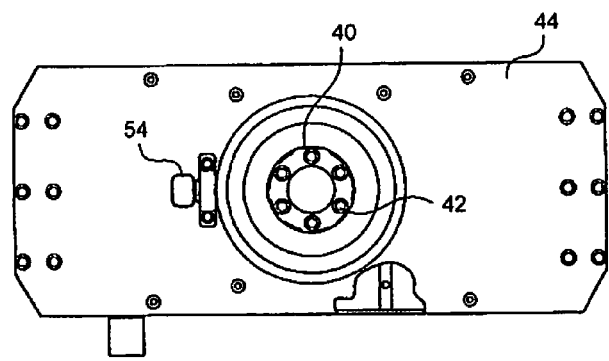
FIG. 4
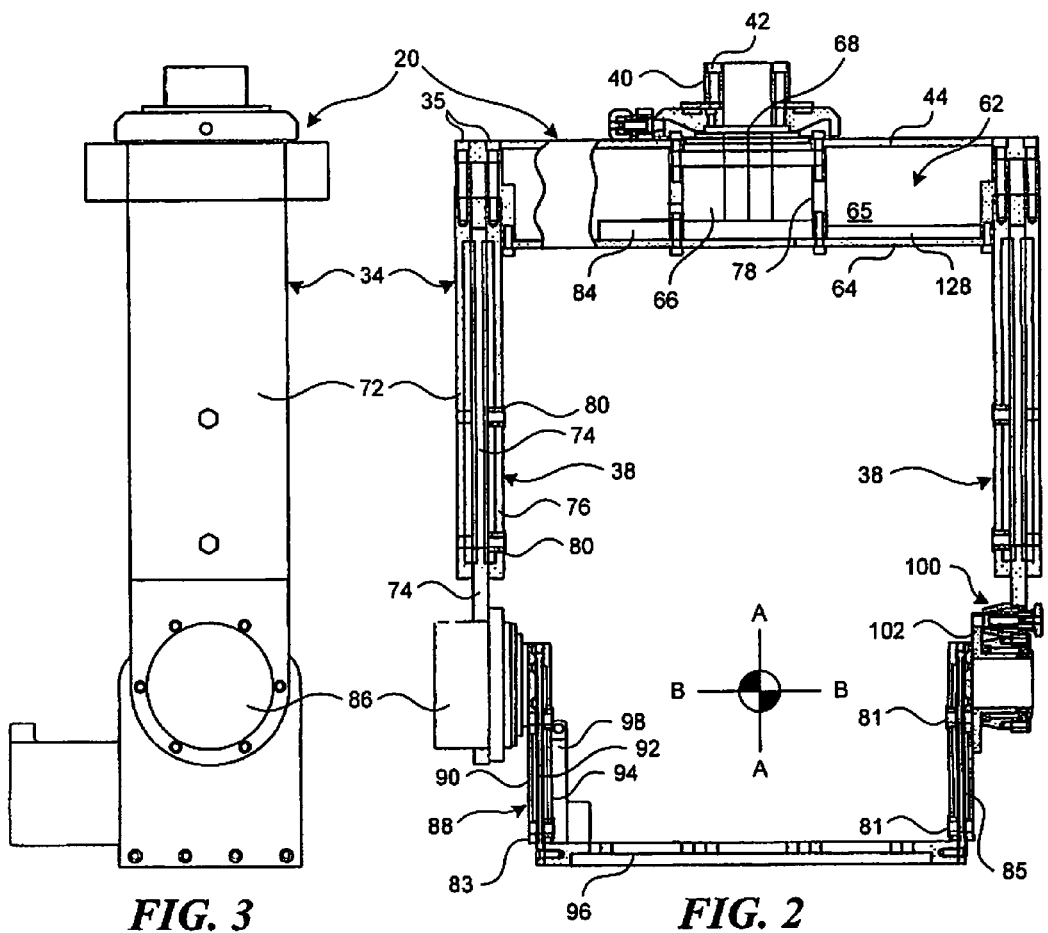
FIG. 3  FIG. 2

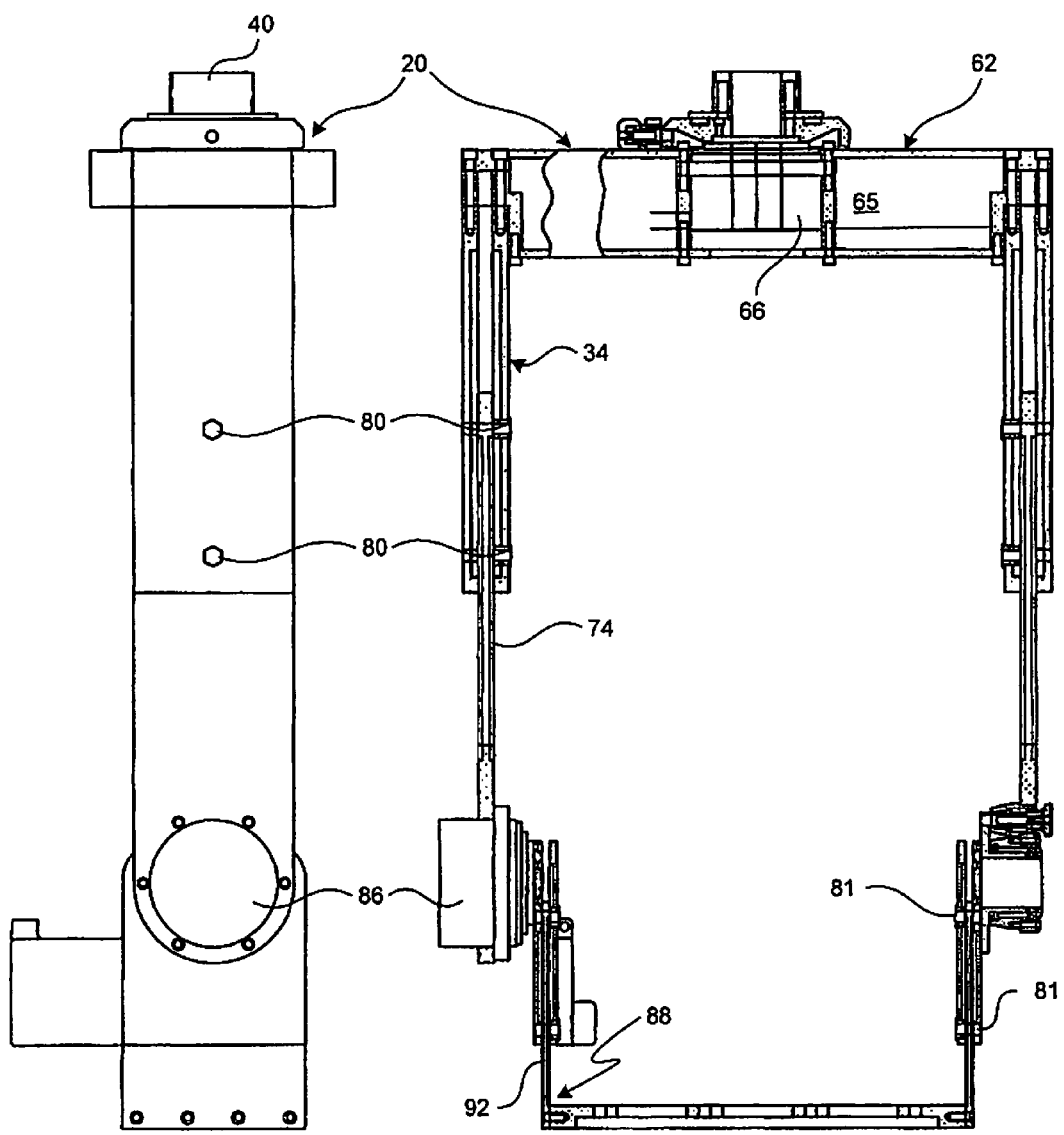
*FIG. 6*     *FIG. 5*

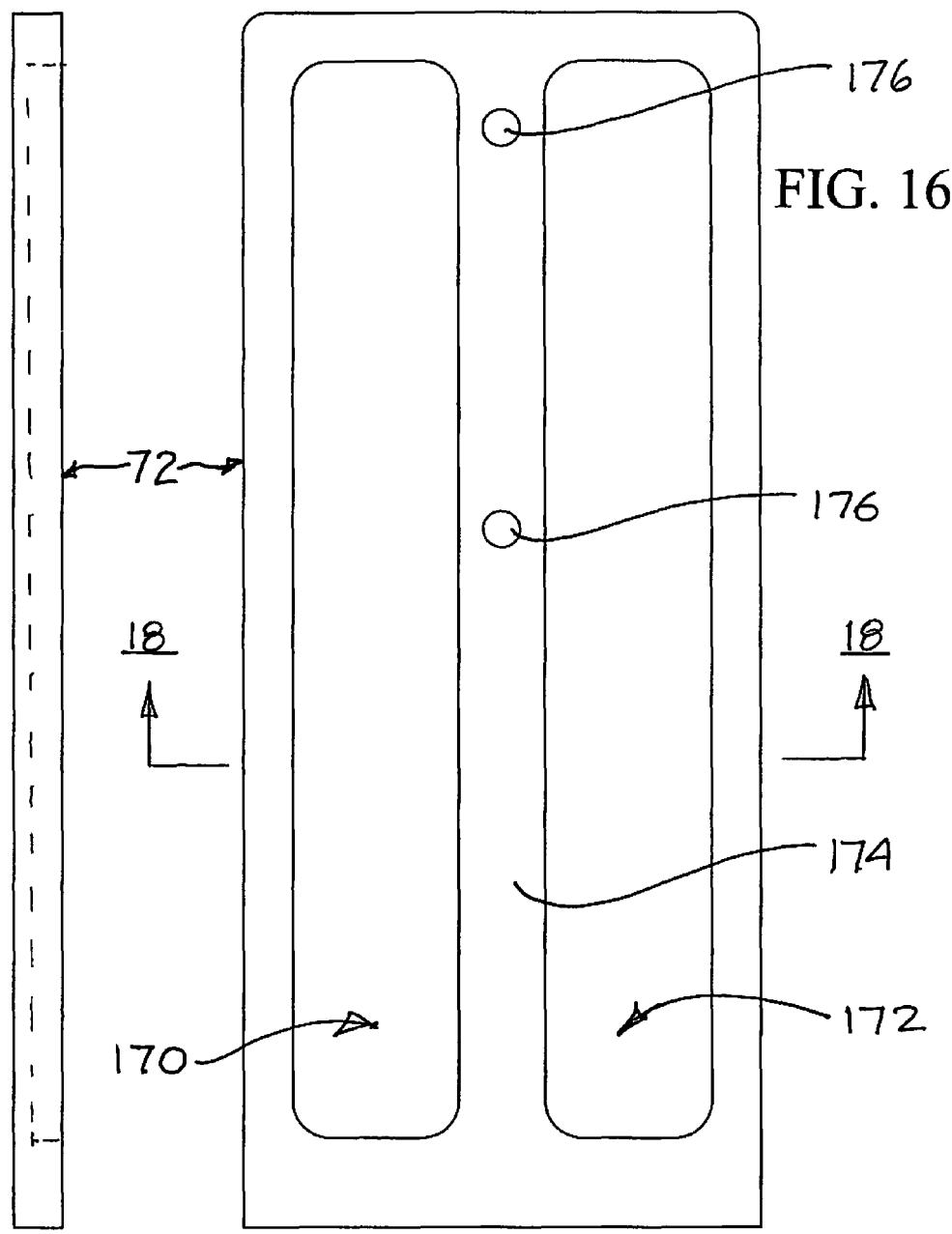
FIG. 16
FIG. 17
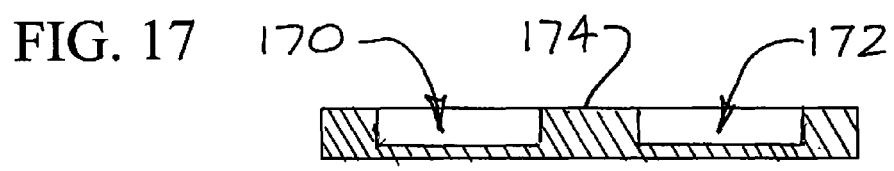
FIG. 18

EXPANDABLE TWO AXIS OR THREE AXIS CAMERA SUPPORT

BACKGROUND

The field of the invention is camera supports.

In motion picture, television or video filming or recording, the camera is often supported on a vehicle, to follow an action or moving sequence, or to achieve a desired camera angle or effect. Various specialized camera cars, camera trucks, cranes, and dollys have been used for this purpose. Generally, although the camera may be moving, it is important for the camera to be maintained in a steady or stable position. In the most basic form, camera stability has been achieved by mounting the camera on a tri-pod. However, when the camera itself is mounted on and moves with a vehicle, maintaining camera stability often becomes difficult.

For example, with a camera mounted on a camera crane moving along a roadway and filming or recording a fixed subject on the ground, e.g., a building, or a subject which is also moving e.g., another moving vehicle, the camera and the lens of the camera will necessarily move in unintended and undesirable ways, due to various factors. These factors may include changes in the roadway direction or inclination, changes in the vehicle orientation, due to shifting gravitational or inertial loads, wind forces, as well as for other reasons. Undesirable movement can be especially problematic when the camera is used with a magnifying lens. The undesirable camera lens movement resulting from these factors reduces the quality of the filmed or recorded images, by causing the images to be improperly framed, or to appear jumpy or erratic. To reduce or eliminate undesirable lens movement, various camera platform or camera head stabilization systems have been proposed. Generally, these systems sense undesired lens movement. A computer controller then operates electric motors linked to the camera platform. The electric motors move the platform to try to cancel out the undesired lens movement and keep the lens steady and aimed as desired.

A remote camera head is an apparatus that allows the camera to be moved, aimed, or controlled from a remote location (i.e., a location not immediately behind the camera). Typically, a remote camera head is mounted on a camera crane. The crane can move the camera head, and the camera on the head, into locations not accessible using conventional camera operations (i.e., with a camera operator behind the camera and controlling camera movement by hand). For example, a camera on a camera head may be suspended on a crane arm extending out over the side of a tall building, a cliff, a waterfall, etc., i.e., in a position where it would be unsafe, impractical, or impossible to perform conventional camera operations.

In general, remote camera head operations involve placing the camera on a remote camera head which can perform pivoting or rotational movement in three axes, known as pan, tilt, and roll. Electric motors on or in the remote camera head are remotely controlled (via cables or wireless links) by a camera head operator, typically on the ground, or on the vehicle supporting the crane arm. Operation of the camera itself is similarly remotely controlled. The electric motors may also be linked to a stabilization system, as described above, so that steady and accurate aiming of the camera is not disturbed by undesired movements.

Generally, a camera head is selected based on the size and weight of the payload, i.e., the camera, lenses, and accessories to be used with it. While a large camera head can of course hold a large payload, a large camera head also adds weight and bulk that the camera crane must carry. Consequently, a large camera head may limit the weight of the payload, reduce the speed of desired movements, and reduce the overall versatility of the equipment used. On the other hand, trying to match the size of the camera head to the payload may require having more than one camera head on hand, increasing the cost and complexity of the production.

While existing camera stabilization systems and camera heads have met with varying degrees of success, various engineering challenges remain in designing improved camera stabilization systems and camera heads.

BRIEF DESCRIPTION OF THE DRAWINGS

In the drawings, the same elements in different figures are indicated with the same element number.

FIG. 2 is a front view of the new camera head.

FIG. 3 is a side view of the camera head shown in FIG. 2.

FIG. 4 is a top view.

FIG. 5 is a side view of the camera head shown in FIG. 2, but with the camera head now in an extended position.

FIG. 6. is a side view of the camera head as it is shown in FIG. 5.

FIG. 16 is a front view of the outer pan arm plate shown in FIG. 2.

FIG. 17 a side view of the outer pan arm plate shown in FIG. 16.

FIG. 18 is a section view taken along line 18-18 of FIG. 16.

DETAILED DESCRIPTION OF THE DRAWINGS

Figure 1:
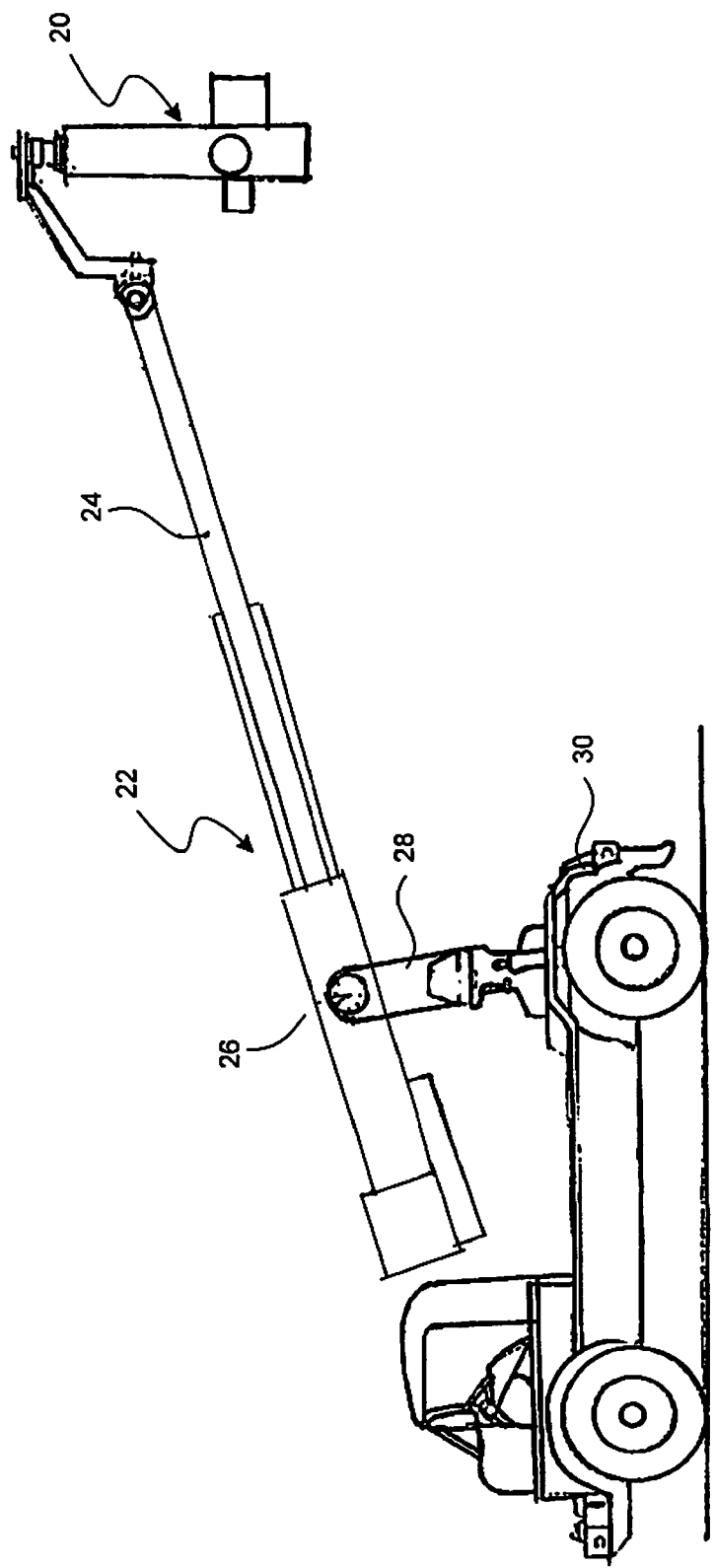
FIG. 1 is a side view of the new camera head supported on a telescoping camera crane.

As shown in FIG. 1, a camera head 20 is supported on the arm 24 of a camera crane 22. The camera crane 22 may pivot vertically on an axle 26 attached to a U-frame 28 on a mobile crane base or vehicle 30. The U-frame 28 typically can pivot on the vehicle to move the crane 22 horizontally (in azimuth). The head 20 may optionally be supported on a fixed base, or it may be supported on a smaller vehicle such as a camera dolly.

Turning to FIGS. 2, 3 and 4, the camera head 20 includes a pan frame 34 pivotally supported on a hub 40. The hub 40 may have threaded stud or bolt for attaching the head 20 to the crane 22 or other support structure. The pan frame 34 includes a head housing or frame 62 which may include a head plate 44 and a connector plate 64 both attached (e.g., bolted) to a pan motor housing 78. Side plates may be attached to the head plate 44 and the connector plate 64 to provide a head housing 62 enclosing an electronics compartment 65. A pan motor 66 is attached to the pan motor housing 78 on or in the head housing 62. A shaft 68 of the pan motor is attached to the hub 40, typically via cap screws 42. Consequently, when the pan motor 66 is actuated, the pan motor applies torque causing the pan frame 34 to pivot about a pan axis AA relative to the fixed hub 40. A pan gyro sensor 84 is provided on or in the head housing, or elsewhere on the pan frame 34, for sensing movement of the pan frame about the pan axis. The head housing 62 may alternatively be a simple plate, extrusion, or other structure.

Figure 10:
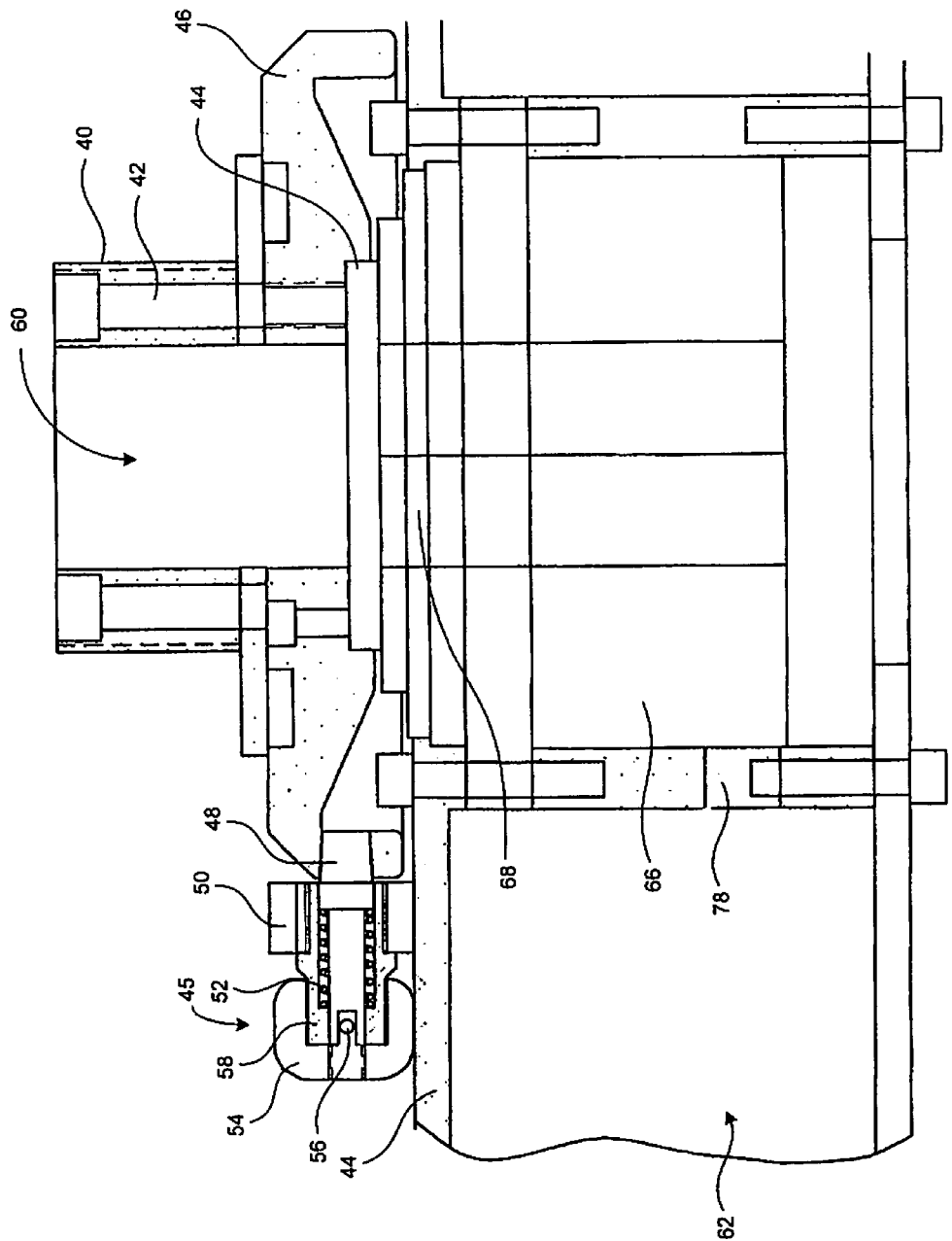
FIG. 10 is an enlarged detail view of the attachment hub shown in FIG. 2.

Referring momentarily to FIG. 10, a pan axis lock 45 may be provided to lock the pan frame 34 at a desired angular position relative to the hub 40. If used, the pan axis lock 45 may include an index pin 48 supported within a pin receiver 58 and biased radially inwardly by a compression spring 52. The pin receiver 58 may be secured in place on the head plate 44 via a pin frame 50. A release pin 56 extends perpendicularly through the outer end of the index pin 48. A finger knob 54 is attached to the outer end of the index pin 48. An index ring 46 fixed to the hub 40 has radially spaced apart holes, for example, 12 holes spaced apart by 30 degree increments. As shown in FIG. 10, with the index pin 48 in the lock position, the inner end of the index pin extends radially into a hole in the index ring 46. This prevents any pivoting movement of the pan frame 34. To release the pan frame and allow for panning movement, the user pulls the finger knob 54 radially outward against the spring force. This movement withdraws the index pin 48 from the index ring. The user then turns the finger knob one quarter turn, causing the release pin 56 to rest on the end of the receiver 58, instead of in the slot as it is shown in FIG. 10. The release pin 56 consequently holds the index pin 58 away from the index ring 46, against the force of the spring 52. The pan frame 34 is then free to pivot about the pan axis.

Referring once again to FIGS. 2-4, the pan frame 34 may have a generally inverted U-shape formed via two spaced apart pan arms 36 and 38 attached to the head housing 62. The pan arms 36 and 38 may be formed via straight flat plates attached at or near the opposite ends of the head housing 62. In the specific design shown, the pan arms 36 and 38 are parallel to each other and each pan arm has an outer pan arm plate 72 and an inner pan arm plate 76, with a slot or groove between them. A center pan plate 74 is slidably or telescopically positioned between the outer and inner pan arm plates, in each pan arm 36 and 38. Pan frame position elements 80, such as bolts extending through slots or holes in the center pan plate 74, may be used to lock the center pan plate 74 in position. Alternatively, the positioning elements 80 may press against a side surface of the center pan plate 74, to clamp it in place. Other positioning elements such as levers, cams, pins, etc. may also be used to lock the center pan plate 74 into a desired position. The length of the pan arms 36 and 38 may be adjusted by loosening or releasing the positioning elements 80, sliding the center pan plate 74 on each pan arm 36 and 38 into the desired position, and then re-engaging or re-tightening the positioning elements. Index marks, such as a millimeter/centimeter scale, may be provided on the center plan plates 74 to provide a visual indication of the length of the pan arms.

Figure 9:
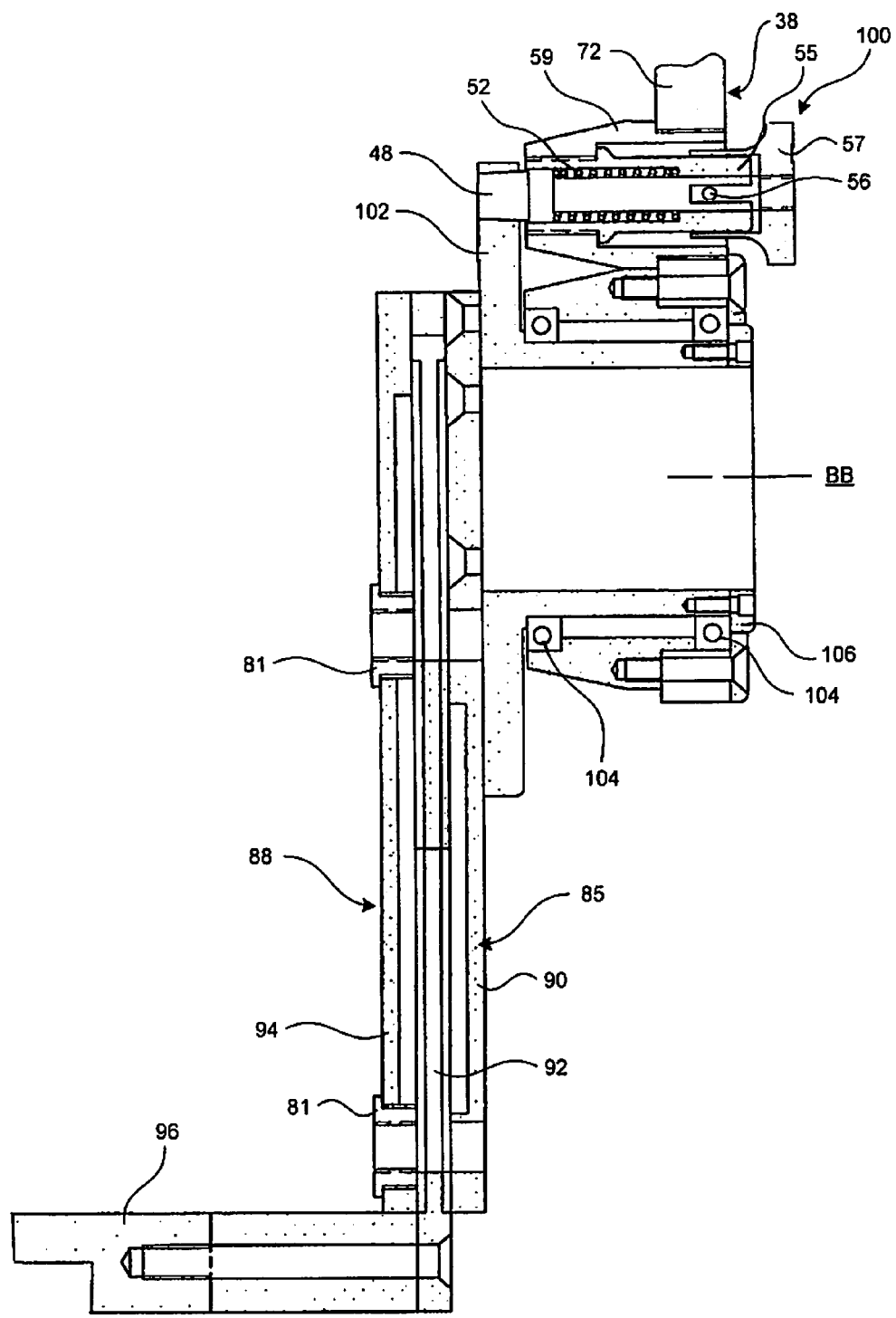
FIG. 9 is an enlarged detail view of the tilt frame as shown in FIG. 7.

As shown in FIGS. 2 and 3, a tilt axis motor 86 is attached near the lower end of the center pan plate 74 of the first pan arm 36, and a tilt hub 102 is attached near the lower end of the center pan plate 74 of the second pan arm 38. A tilt frame 88 is attached to the tilt axis motor 86 and to the tilt hub 102. Turning also now to FIG. 9, the tilt frame 88 includes a camera mounting plate 96 attached to the lower ends of first and second tilt arms 83 and 85. The tilt arms 83 and 85 may be made to have an adjustable length in the same way as the pan arms 36 and 38 as described above. Specifically, each tilt arm 83 and 85 may include an outer tilt arm plate 90 and an inner tilt arm plate 94, with a slot or groove formed between them. A center tilt plate 92 may be positioned between the outer and inner tilt plates. The camera mounting plate 96 is then attached to the lower end of each center tilt plate 92. Tilt frame positioning elements 81, which may be the same as the pan positioning elements 80, hold the center tilt plates 92 at a desired position. The camera mounting plate 96 has holes and slots to accommodate mounting a camera and accessories. A tilt axis gyro sensor 98 may be attached to the first tilt arm 83, to sense motion about the tilt axis.

The pan frame may be considered as including the head housing 62, the pan arms 36 and 38, including the center pan plates 74, the tilt motor 86 and the tilt hub 102. These are the elements that rotate together about the pan axis AA, but do not move with the tilt frame. The tilt motor 86 may optionally be located on the tilt frame, with the shaft of the tilt motor attached to the center plate 74 of the pan arm 36. In this case, the tilt motor would be part of the tilt frame and not the pan frame. Generally though, improved results are achieved with the tilt motor 86 on the pan frame and not on the tilt frame, since this reduces the weight of the tilt frame, and simplifies wiring to the tilt motor 86.

Referring still to FIG. 9, the tilt frame 88 may have a tilt axis lock 100, which may be similar to the pan axis lock 45 described above. If used, the tilt axis lock 100 may include the tilt hub 102 supported on bearings 104 at the lower end of the second pan arm 38 and provided with multiple circumferentially spaced apart holes. An end cap 106 is attached to the outer end of the hub 102 to secure the hub in place on the tilt arm center plate 72. An index pin 48 is biased outwardly from a tilt pin barrel 55 via a compression spring 52. The tilt pin barrel is secured within a tilt pin receiver 59 on the center pan plate 72.

A release pin 56 extends perpendicularly through the outer end of the index pin 48 within a slot in the outer end of the tilt pin barrel 55. A finger knob 57 is attached to the outer end of the index pin 48. As shown in FIG. 9, with the index pin 48 in the lock position, the inner end of the index pin extends radially into a hole in the index tilt hub 102. This prevents any pivoting movement of the tilt frame 88. To release the tilt frame and allow for tilting movement of the camera platform plate, the user pulls the finger knob 57 out against the spring force. This movement withdraws the index pin 48 from the index tilt hub 102. The user then turns the finger knob 57 one quarter turn, causing the release pin 56 to rest on the end of the receiver 55, instead of in the slot as it is shown in FIG. 9. The release pin 56 consequently holds the index pin 48 away from the index tilt hub 102, against the force of the spring 52. The tilt frame 88 is then free to pivot about the tilt axis BB.

In use, the head 20 is attached to a camera crane 22 or similar support, as shown in FIG. 1. The hub 40 may have a threaded stud section that attaches to a mounting plate on the crane 22. Regardless of the attachment technique used, the hub or equivalent structure of the head is irrotatably attached to the crane. Typically, the head 20 may initially be oriented at a zero degree straight ahead position relative to the crane. A camera is then mounted on the camera mounting plate 96. The pan axis lock 45 and the tilt axis lock 100 may be engaged to prevent movement of the camera platform 96, making it easier to attach the camera to the mounting plate 96. Although FIG. 1 shows the head 20 suspended below the crane in an underslung position, the head 20 may optionally be set up in an overslung position, with the crane supporting the head from below. In an overslung position, the head 20 would appear as inverted from FIGS. 2 and 3, with the tilt frame 88 vertically above the pan frame 34 and the hub 40 at the bottom of the head 20.

Figure 11:
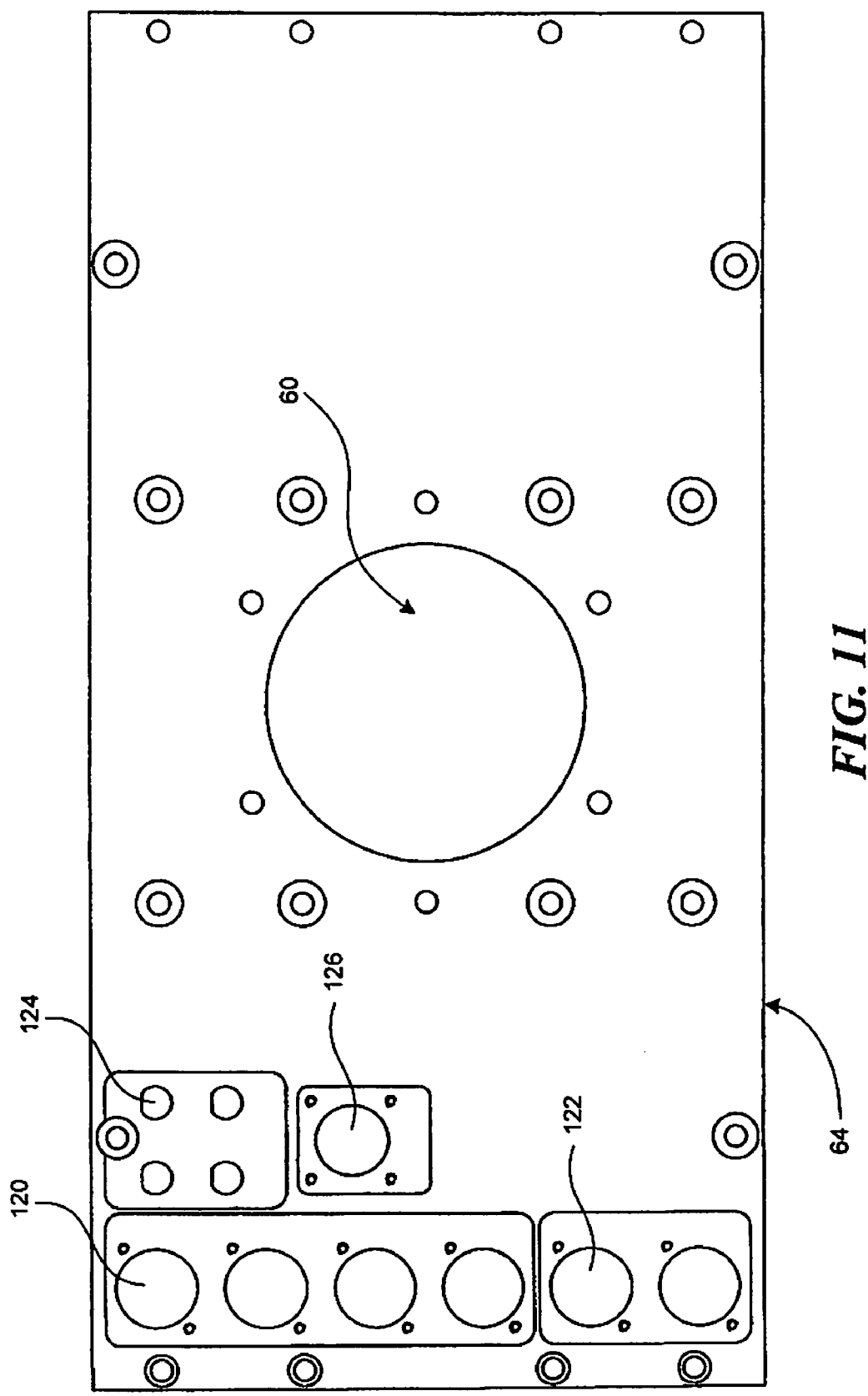
FIG. 11 is bottom view looking up of the connector plate shown in FIG. 2.

Power and control cables from the camera may be routed through a central opening in the tilt motor 86 and/or the tilt hub 102, alongside either pan arm, and plugged into connectors 120, 122, 124 and 126 on the connector plate, shown in FIGS. 2 and 11. A primary cable may then run from one or more of the connectors, or from within the electronics box 65, up through the hub 40 and back on the crane 22 to a control panel on the vehicle base 30, or to a tethered portable control panel held by the camera operator. A wireless link may alternatively be used for control signals. With the camera installed, the pan and tilt axis locks 45 and 100 are disengaged. As the crane 22 moves, the gyro sensors 84 and 92 detect movement of the pan and tilt frames, and provide corresponding signals to a computer controller 128, which may be in the electronics box 65. The computer controller 128 then controls the pan motor 66 and tilt motor 86 to keep the camera platform 96 in a desired position. The computer controller 128 may control current supplied to the pan motor 66 to control the direction, speed and acceleration of panning movement. The computer controller may similarly controls current supplied to the tilt motor 86. The pan and tilt motors 66 and 86 may be harmonic drive motors which inherently are highly compact, have little or no backlash, and provide high reduction ratios without conventional gearing.

Various cameras may be mounted on the camera mounting plate 96, with sufficient clearance on all sides to avoid interference between the camera and the head 20. However, certain larger camera installations require additional space. The additional clearance space may be required due to the size of the camera itself, or due to an accessory, such as a film magazine on the camera. The head 20 has adjustable length pan arms 36 and 38 to accommodate larger camera set ups. Referring to FIGS. 2 and 3, as the tilt angle of the camera mounting platform 96 changes, sufficient vertical clearance is required to avoid contact between the connector plate 64 and the top of the camera or film magazine. If necessary, the spacing between the camera mounting platform 96 and the connector plate 64 may be increased, to provide additional clearance.

This may be accomplished by temporarily loosening or releasing the positioning elements 80, such as cap screws, on both pan arms 36 and 38. The tilt frame 88 is then moved downwardly or away from the connector plate 64, with the center pan plate 74 sliding partially out from between the inner and outer pan plates 72 and 76, on each pan arm 36 and 38. In a typical design, this may increase the length of the pan arms by 4-8 inches. FIGS. 5 and 6 show the head 20 with the pan arms at a maximum length position. With the tilt frame at the desired position, the positioning elements are re-tightened or re-engaged, to once again securely hold the tilt frame vertically in place relative to the pan frame.

Figure 19:
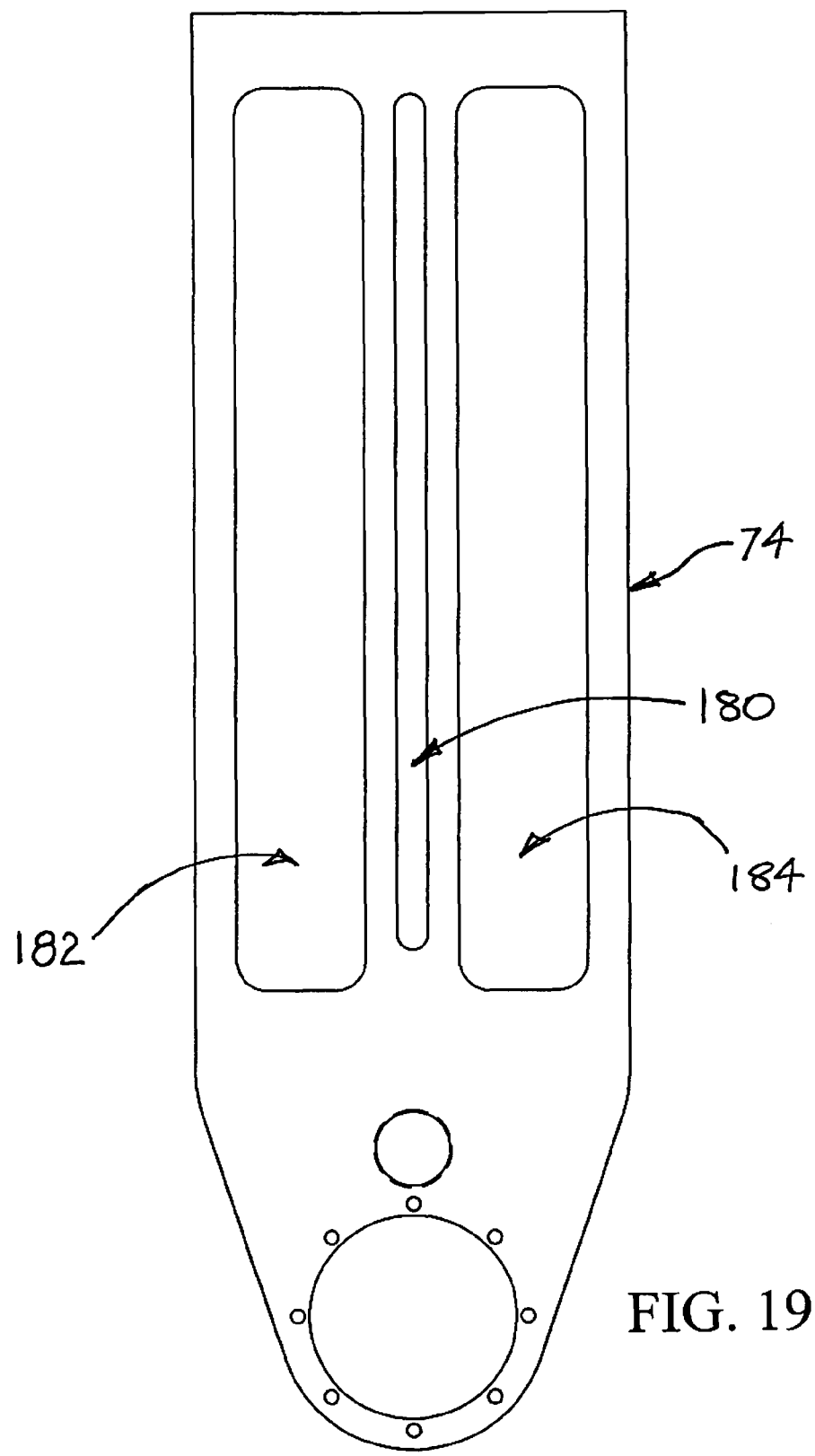
FIG. 19 is a front view of the center pan plate shown in FIG. 2.

One way of making the pan arms with adjustable length is shown in FIGS. 16-19. FIG. 16 is a front view of an outer pan arm plate 72. The outer pan arm plate 72 may be formed from a generally rectangular plate. Blind recesses 170 and 172 may be provided on either side of a central land area 174, to provide a lightweight, yet rigid structure. The inner pan arm plate 76 may have the same design as shown in FIG. 16, optionally with threaded bolt holes 176. FIG. 19 shows a front view of a center pan plate 74 which may have through-cutouts 182 and 184 on either side of a central land area. The positioning elements or bolts pass through a center slot 180. The recesses 170 and 172 align over the cutouts 182 and 184. When tightened, the bolts 80 compress and clamp the central land area of the center pan plate 74 between the land areas 174 of the inner and outer pan arm plates. This securely holds the tilt frame in place.

In this way, cameras of varying size may used on the head 20. Of course, various other designs may be used to equivalently vary the length of the pan arms, including designs using screw threads, extending linkages, telescoping pole sections, ratcheting devices, etc. A pin may extend through a slot in the center pan plate 74 in each pan arm 36 and 38, to prevent the center plates 74 from withdrawing fully and separating from the pan arms. This prevents the tilt frame 88 from accidentally dropping off of the pan frame 34. The positioning elements, such as cap screws 80, may be loosened, the tilt frame moved to a desired position, and the cap screws 80 the retightened, in very little time. This allows the head 20 to be quickly changed over into a desired configuration. The inner and outer pan plates 72 and 74

Figure 7:
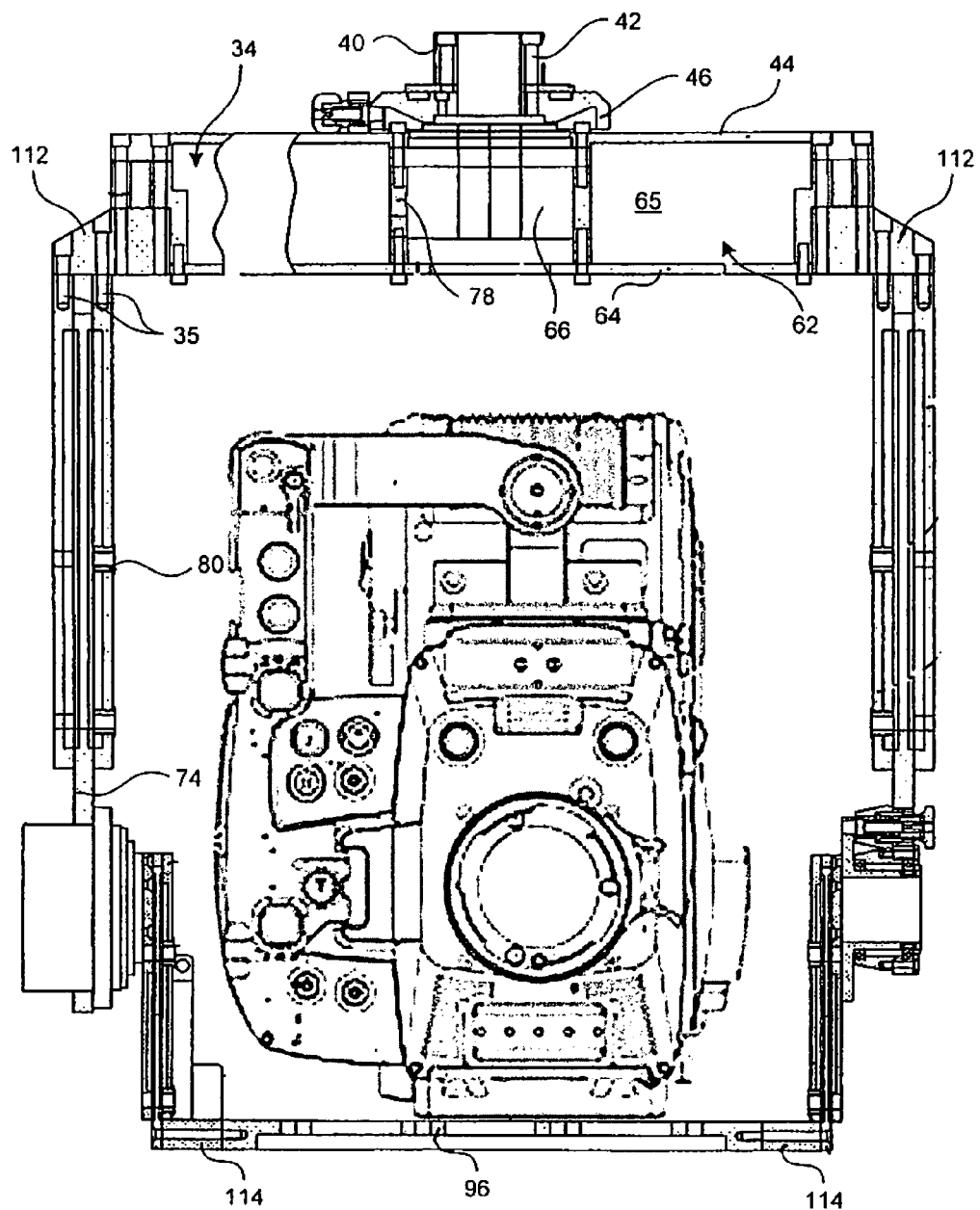
FIG. 7 is a front view of the camera head of FIG. 2 but with side extensions added to accommodate a wider payload.
Figure 8:
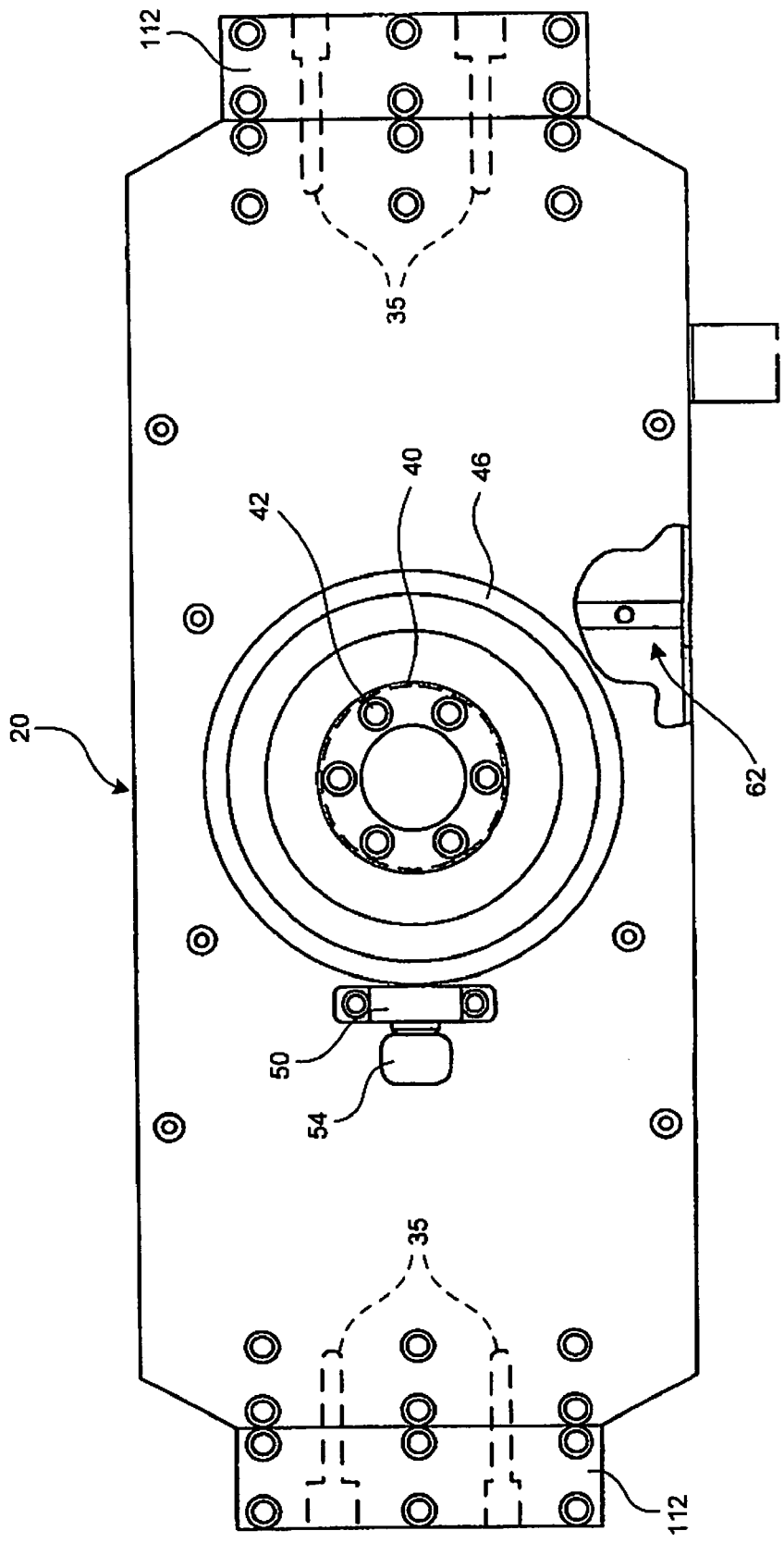
FIG. 8 is a top view of the camera head as it is shown in FIG. 7.

The head 20 may also be set up to accommodate an overly wide camera set up. Referring to FIGS. 7 and 8, to provide additional width within the head 20, the pan arms 36 and 38 are temporarily removed from the head housing 62 of the pan frame 34. The cap screws 35 attaching the pan arms to the head housing 62 are backed out to allow the pan arms to separate. Side bars 112 are then attached to head housing 62 via cap screws extending laterally through the side bars and into threaded holes on opposites sides of the head housing 62, as shown in FIG. 8. The pan arms are then attached to the side bars 112, as shown in FIG. 7. Plate extensions 114 are also installed at each end of the camera mounting plate 96, to extend the width of the tilt frame. As shown in FIGS. 7 and 8, the head 22 is then widened to accommodate a wider camera. The amount of width extension may be varied by selecting the dimensions of the side bars and the plate extensions. Typically, and extension of 1-4 on each side, for a total width increase of 2-8 inches, is sufficient for handling most payloads.

In a standard set up, the head 20 is used as shown in FIG. 2, without side bars and plate extensions, and with no extension of the pan arms. This provides the most compact configuration, which is generally preferable, unless a larger configuration is needed to accommodate an oversize camera. The compact configuration shown in FIG. 2 is has a lower moment of inertia in comparison to expanded configurations. This allows for better aiming or steering control, and better gyro stabilization of the head, since less controlling or corrective torque is required from the motors. Generally, a lower moment of inertia allows for faster and more effective corrective movements of the pan and tilt frames. In addition, since the standard configuration shown in FIG. 2 is more compact, the head 20 is more easily maneuvered in tight spaces, for example, in moving the head through a window or a door to achieve a desired camera shot.

FIG. 2 shows the tilt frame 88 is the standard position, with no extension provided via the adjustable length tilt arms 83 and 85. FIG. 5 shows the tilt frame 88 with the tilt arms adjusted outwardly or extended to a maximum length. In the configuration shown in FIG. 5, the camera platform 96 is from 2-6 inches further from the tilt axis BB than in FIG. 2. The adjustable length tilt arms may be used to shift the center of gravity of the payload or camera as need to better align it on the tilt axis. This helps to avoid eccentric loading on the tilt frame. Locating the center of gravity of the payload on the tilt axis BB minimizes the moment of inertia of the payload.

Consequently, the torque required from the tilt motor 86 to provide tilt frame movements is reduced.

With most professional cameras, the center of gravity of the camera is aligned along an axis passing nearly centrally through the lens of the camera. Ordinarily, it is then desirable to be able to align the lens of the camera on the tilt axis BB, as well as on the pan axis AA, to achieve a centrally balanced load on the head, with a minimized moment of inertia about both the pan and tilt axes. The adjustable length tilt arms allow for this adjustment. Of course, in some cameras the center of gravity may be displaced from the axis of the lens. In other cases, accessories attached to the camera can also shift the center of gravity. In these cases, the load may be balanced with the lens offset from the tilt axis BB.

Figure 12:
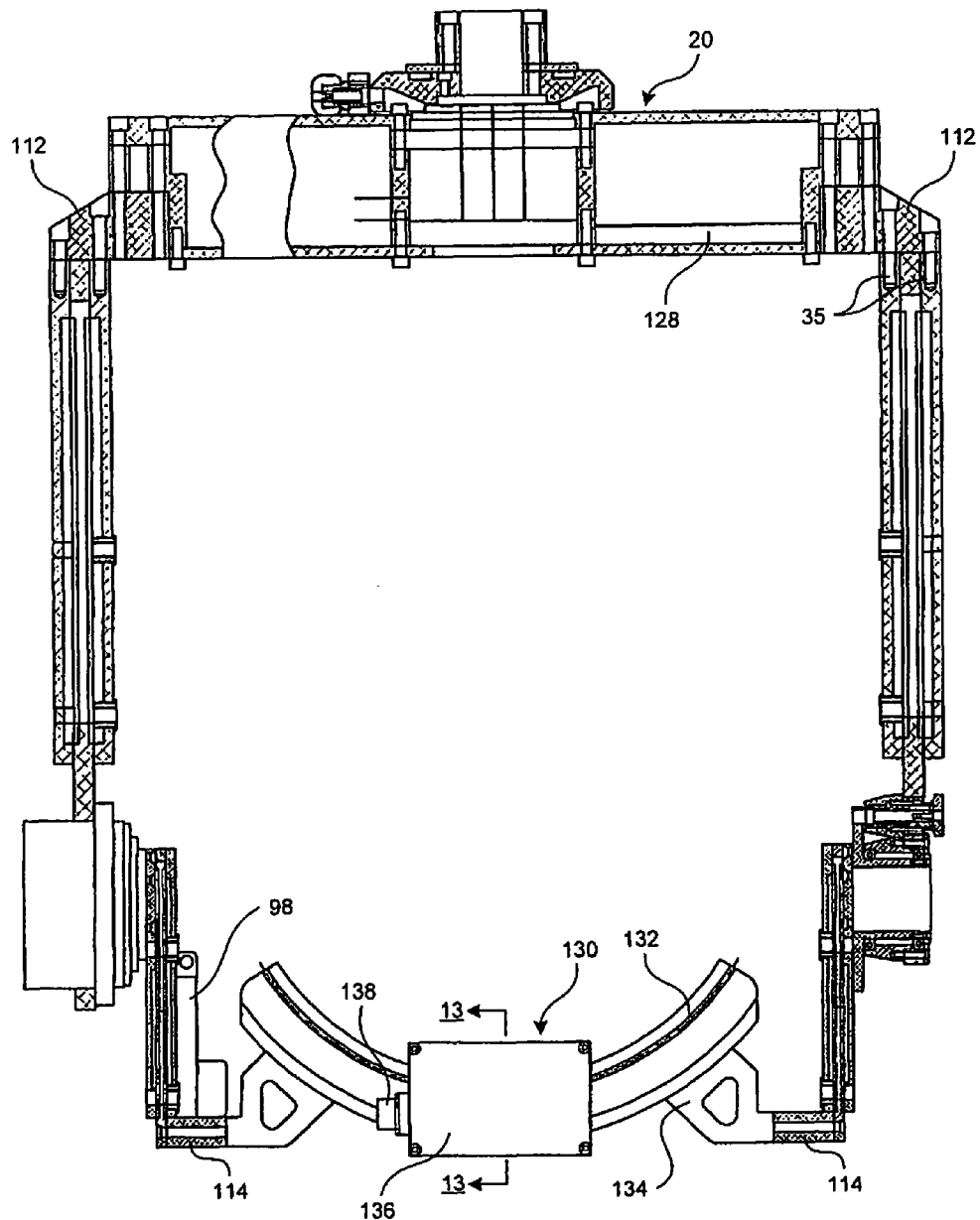
FIG. 12 is a front view of an alternative design including roll frame.
Figure 13:
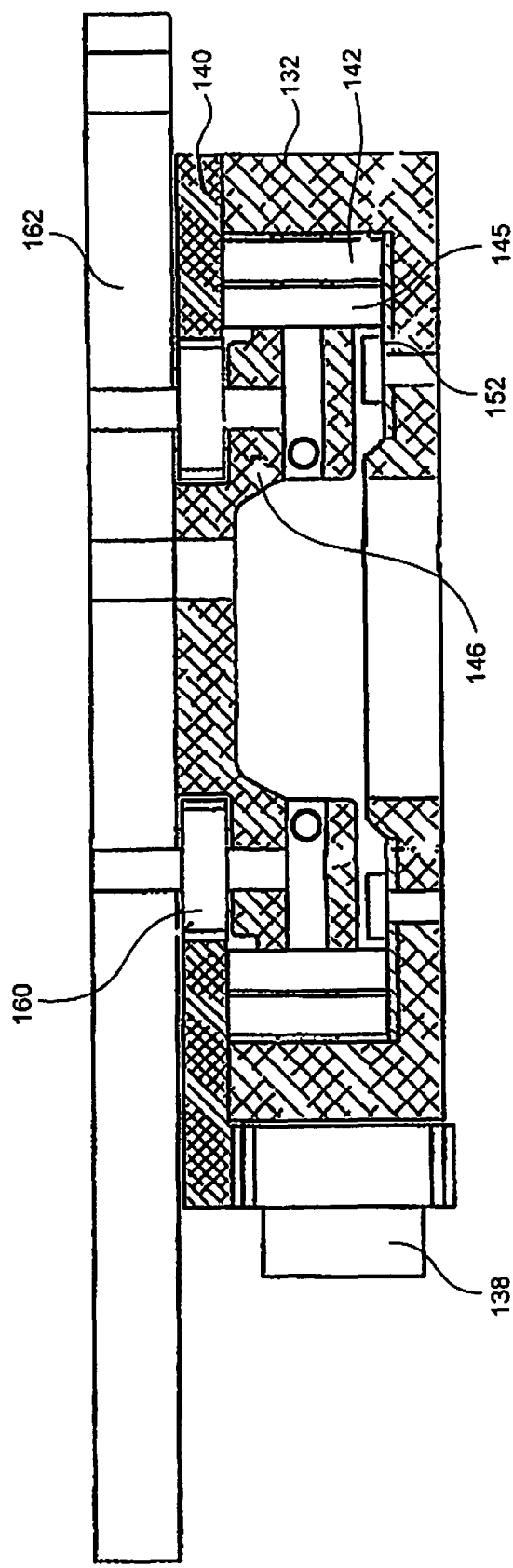
FIG. 13 is a partial section view taken along line 13-13 of FIG. 12, which components omitted for clarity of illustration.

FIGS. 2 and 3 show a two-axis camera head 20. The camera head 20 can move the camera platform about two axes, the pan axis AA and the tilt axis BB. FIG. 12 shows conversion of the two axis camera head of FIG. 2 into a three axis camera head. In FIG. 12, the camera platform or camera mounting plate 96 is removed and replaced with a roll frame 130. As shown in FIGS. 12 and 13, the roll frame 130 has a curved track 132 with a constant radius of curvature, typically ranging from about 6 to 12 inches. The track 132 is attached to the tilt frame 88 via track arms 134 attached to plate spacers on the lower ends of the tilt arms.

Figure 15:
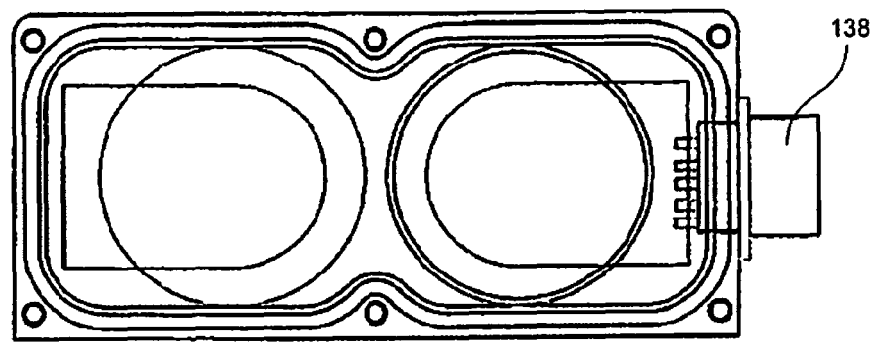
FIG. 15 is an end view of the roll frame drive motor assembly shown in FIG. 14.
Figure 14:
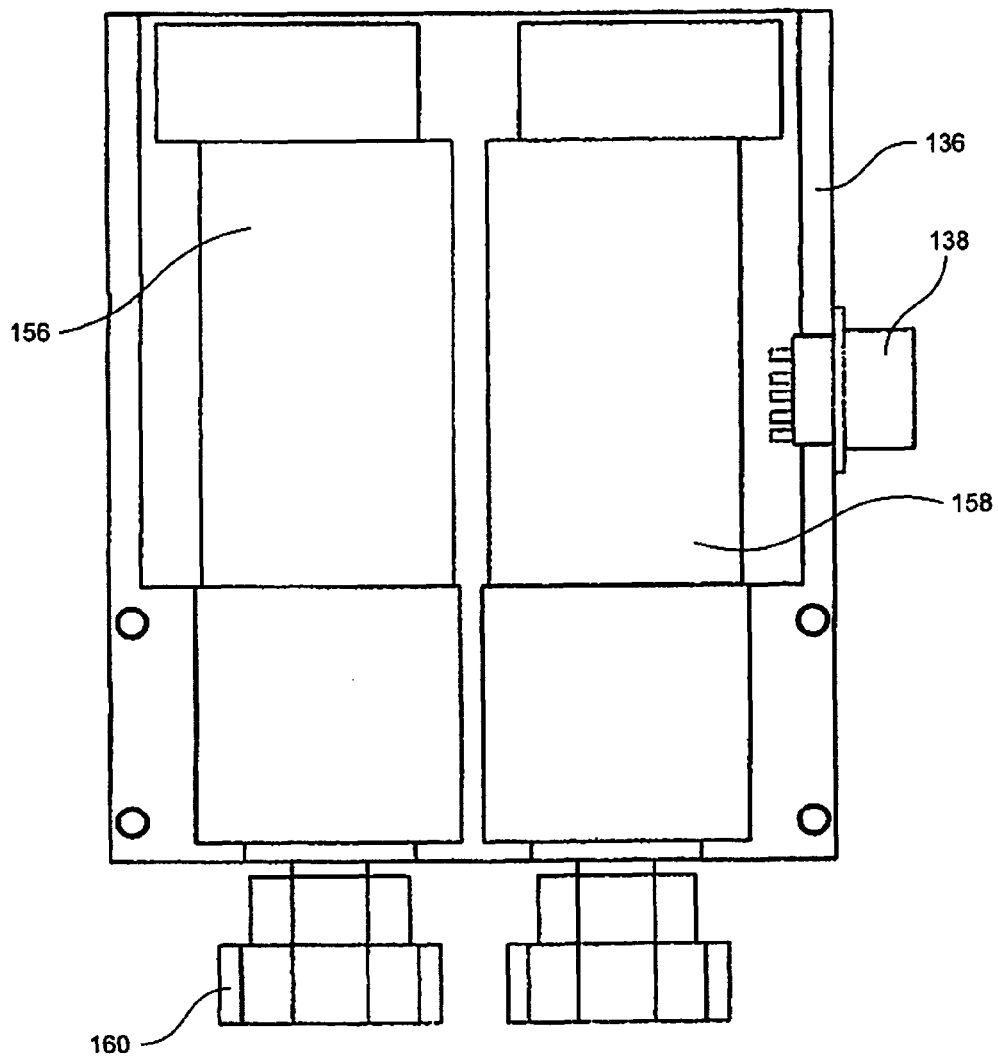
FIG. 14 is a top view of the roll frame drive motor assembly shown in FIG. 12.

Turning now also to FIGS. 13-15, a carriage 146 includes a roll motor housing 136 contains first and second roll motors 156 and 158, each driving a gear 160 meshed with a rack on the track 132. Outer rollers 142 on the carriage 146 roll on a steel liner 152 on a lower surface of the track 132. Inner rollers 145 roll on a down facing upper surface of the track 132. The surfaces of the track that the rollers 142 and 145 roll on may be precisely machined so that while the rollers may be supported on a common axle, they only actually contact the lower and upper track surfaces, respectively. This avoids backlash or play between the camera mounting plate 162 and the track 132. The rollers are round, with the flat circumferential surfaces of the rollers rolling on a flat surface of the track. This reduces rolling friction in comparison to V-groove and dove tail designs. The rollers are machined to close tolerances since gyro-stabilization is negated if there is play between the motors and the payload. A cover plate 140 extends over the top of the rollers 142 to prevent the carriage 146 from lifting off of the track 132. A top surface of the carriage 146 forms a camera mounting plate 162. Power and control signals are provided to the motors 156 and 158 from the controller 128 via a cable linked to a connector 138 on the roll motor housing 136. The cable has sufficient slack to avoid restraining movement of the carriage on the track.

In use, the motors 156 and 158 may be controlled to move the carriage 146 along the track to provide roll movement of a camera mounted on the plate 162. The motors may be controlled to reduce or eliminate backlash in the drive system, as described for example in US Patent Publication 2008/0002967, incorporated herein by reference. Referring back to FIG. 12, if the lens of the camera is aligned at the center of curvature of the track when the camera is mounted on the plate 162 of the roll axis carriage 146, then movement of the carriage on the track 132 will cause the camera to pivot around the optical axis of the lens, changing only the angle between the camera and the horizon, but without actually displacing the lens vertically or horizontally. If the camera is mounted on the plate 162 with the lens of the camera off set from the center of curvature, then movement of the carriage along the track will result in actual translational movement of the lens, as well as rotational movement.

Thus, novel camera heads have been shown and described. Various equivalents and modifications may of course be made without departing from the spirit and scope of the invention. The invention, therefore, should not be limited, except to the following claims and their equivalents.

The invention claimed is:

1. A camera support comprising:
   a support hub;
   a pan frame pivotably attached to the support hub, with the pan frame including:
   a head plate having a first end and a second end;
   a first adjustable length pan arm attached at the first end of the head plate;
   a second adjustable length pan arm attached at the second end of the head plate, with the second pan arm substantially parallel to the first pan arm;
   a pan motor attached to the pan frame and adapted to pivot the pan frame about a pan axis relative to the support hub;
   a tilt frame pivotably attached to the pan frame, with the tilt frame including:
   a camera mounting plate;
   a first adjustable length tilt arm attached at a first end of the camera mounting plate;
   a second adjustable length tilt arm attached at a second end of the camera mounting plate, with the second tilt arm substantially parallel to the first tilt arm; and
   a tilt motor attached to the tilt frame and adapted to pivot the tilt frame about a tilt axis perpendicular to the pan axis.

2. The camera support of claim 1 with the tilt motor supported at a lower end of the first adjustable length pan arm.

3. The camera support of claim 1 wherein the first tilt arm is parallel to the first pan arm and the second tilt arm is parallel to the second pan arm.

4. The camera support of claim 1 wherein the first and second tilt arms are positioned between the first and second pan arms.

5. The camera support of claim 1 wherein the first adjustable length pan arm comprises a center plate slidably positionable between an outer pan arm plate and an inner pan arm plate.

6. The camera support of claim 1 further comprising an electronics box attached to head plate, with the pan motor enclosed within the electronics box.

7. The camera support of claim 6 further comprising cable way extending through a central opening in the support hub and the pan motor, and a cable harness routed through the cable way and electrically connecting to the electronics box.

8. The camera support of claim 1 further comprising a pan lock pin on the pan frame moveable from a first position wherein the pan lock pin engages the support hub and prevents movement of the pan frame relative to the support hub, to a second position wherein the pan lock pin is disengaged from the support hub to allow pivoting movement of the pan frame relative to the support hub.

9. The camera support of claim 1 further comprising first pan frame extension bar between the first adjustable length pan arm and the first end of the head plate, and a second pan frame extension bar between the second adjustable length pan arm and the second end of the head plate, with the first and second pan frame extension bars increasing a spacing between the first and second adjustable length pan arms by a dimension DD, and a first plate extension between the first adjustable length tilt arm and the first end of the camera mounting plate, and a second plate extension between the second adjustable length tilt arm and the second end of the camera mounting plate, with the first and second plate extensions increasing a spacing between the first and second adjustable length tilt arms also by a dimension DD.

10. The camera support of claim 1 with the camera mounting plate comprising a roll frame attached to the tilt frame, with the roll frame including a curved track, and a carriage moveable along the curved track, with the carriage including at least one roll axis motor adapted to move the carriage along the curved track.

11. The camera support of claim 10 with the curved track including a toothed gear rack, and with carriage including a first roll axis motor having a first gear meshed with gear rack and a second roll axis motor having a second gear meshed with the gear rack.

12. The camera support of claim 10 with the curved track comprising a circular arc subtending less than 60 degrees.

13. The camera support of claim 1 further comprising a motor controller electrically linked to the pan motor and to the tilt motor, and further comprising a pan gyro sensor on the pan frame and a tilt gyro sensor on the tilt frame, with the pan and tilt gyro sensors electrically linked to the motor controller.

14. The camera support of claim 1 wherein the head plate is parallel to the camera mounting plate and wherein the first adjustable length pan arm is parallel to the first adjustable length tilt arm and perpendicular to the head plate.

15. The camera support of claim 1 wherein the first and second adjustable length pan arms are adjustable over a length range of 4-10 inches and the first and second adjustable length tilt arms are adjustable over a length range of 2-6 inches.

16. The camera support of claim 1 wherein the first adjustable length pan arm is parallel to and spaced apart from the second adjustable length pan arm by 15 to 30 inches.

17. A camera support comprising:
a support hub;
a pan frame pivotably attached to the support hub, with the pan frame including:
a head housing having a first end and a second end;
a first adjustable length pan arm attached at the first end of the head housing;
a second adjustable length pan arm attached at the second end of the head housing, with the second pan arm substantially parallel to the first pan arm;
the first and second adjustable length pan arms each including a center plate slidably positioned between an outer pan arm plate and an inner pan arm plate;
at least one positioning element on each of the first and second adjustable length pan arms adapted to clamp the center plate between the outer and inner pan arm plates;
a pan motor in the head housing, with the pan motor having a motor shaft attached to the support hub;
a tilt frame pivotably attached to the pan frame, with the tilt frame including:
a camera mounting plate;
a first adjustable length tilt arm attached at a first end of the camera mounting plate;
a second adjustable length tilt arm attached at a second end of the camera mounting plate, with the second tilt arm substantially parallel to the first tilt arm; and
a tilt motor supported at a lower end of the first adjustable length pan arm, with the tilt motor having a motor shaft attached to the tilt frame;
wherein the first tilt arm is parallel to the first pan arm and the second tilt arm is parallel to the second pan arm, and the first and second tilt arms are positioned between the first and second pan arms.

* * * * *